(12) United States Patent
Blair et al.

(10) Patent No.: US 7,171,129 B1
(45) Date of Patent: Jan. 30, 2007

(54) OPTICAL COMMUNICATION SYSTEM USING COHERENCE MULTIPLEXING IN AN OPTICAL DWDM NETWORK

(76) Inventors: Steven M. Blair, 3434 E. 7590 South, Salt Lake City, UT (US) 84121; Larry L. Campbell, 1599 Devonshire Dr., Salt Lake City, UT (US) 84018

(*) Notice: Subject to any disclaimer, the term of this patent is extended or adjusted under 35 U.S.C. 154(b) by 861 days.

(21) Appl. No.: 10/041,682

(22) Filed: Jan. 7, 2002

Related U.S. Application Data

(60) Provisional application No. 60/260,044, filed on Jan. 5, 2001.

(51) Int. Cl.
*H04B 10/04* (2006.01)
*H04B 10/06* (2006.01)
*H04B 10/12* (2006.01)

(52) U.S. Cl. ............... 398/203; 398/205; 398/185

(58) Field of Classification Search ............... 398/185, 398/200, 201, 203, 205; 359/259, 290
See application file for complete search history.

(56) References Cited

U.S. PATENT DOCUMENTS

| | | | |
|---|---|---|---|
| 4,882,775 A | | 11/1989 | Coleman |
| 5,027,359 A | * | 6/1991 | Leger et al. ............... 372/18 |
| 5,477,369 A | * | 12/1995 | Mahon et al. ............... 398/202 |
| 5,606,446 A | | 2/1997 | Davis et al. |
| 5,691,832 A | | 11/1997 | Liedenbaum et al. |
| 6,011,874 A | * | 1/2000 | Gluckstad ............... 382/276 |
| 6,111,679 A | | 8/2000 | Fishman |
| 2001/0048538 A1 | * | 12/2001 | Kowalski ............... 359/136 |
| 2002/0131693 A1 | * | 9/2002 | Islam et al. ............... 385/24 |
| 2004/0008989 A1 | * | 1/2004 | Hung ............... 398/69 |

OTHER PUBLICATIONS

Kartalopoulos, "Introduction to DWDM Technology", IEEE Press, 2000; pp. 163-167.*

* cited by examiner

*Primary Examiner*—Jason Chan
*Assistant Examiner*—Nathan Curs
(74) *Attorney, Agent, or Firm*—Coursey IP Law, PC; R. Stevan Coursey, Esq.

(57) ABSTRACT

The present invention comprises an optical communication system, including apparatuses and methods, which use coherence multiplexing to optically multiplex different signals that may have varying protocols or operate at different speeds, onto a single wavelength channel which is dense wavelength division multiplexed with other channels for optical communication. The apparatuses and methods of the optical communication system also enable the dropping and inserting of selected single protocol signals at intermediate sites of a DWDM communication link which is less costly and makes less wasteful use of optical wavelength channels for the communication of lower data rate information. The optical communication system comprises an optical DWDM multiplexer, an optical DWDM demultiplexer, an optical DWDM communication network communicatively connected to and interposed therebetween, a plurality of coherence multiplexer units connected for communication with the optical DWDM multiplexer, and a plurality of coherence demultiplexer units connected for communication with the optical DWDM demultiplexer.

2 Claims, 4 Drawing Sheets

OPTICAL COMMUNICATION SYSTEM USING COHERENCE MULTIPLEXING IN AN OPTICAL DWDM NETWORK

CROSS-REFERENCE TO RELATED APPLICATION

This patent application claims priority on and the benefit of the filing date of U.S. provisional patent application 60/260,044 filed on Jan. 5, 2001.

FIELD OF THE INVENTION

The present invention relates, generally, to the field of optical communication networks and, in its preferred embodiments, to the field of apparatus and methods using coherence multiplexing in optical DWDM communication networks.

BACKGROUND OF THE INVENTION

Today's optical communication networks and systems are continually being required to provide higher and higher communication capacities to meet the demands of increasingly data and information intensive applications and an increased number of users of such applications. To provide higher communication capacities, many optical communication networks and systems are being operated at higher transmission rates and/or with very dense wavelength division multiplexing (DWDM) requiring very dense wavelength spacing and very high speed modulation of DWDM channels. The use of such spacing and modulation is often difficult and tends to add great complexity to optical communication networks and systems. As a consequence, the operation of optical communication networks and systems may become quite costly.

In addition, many of the applications require services which utilize multiple data communication protocols such as IP, ATM, and SONET. One approach to providing such services has been to first multiplex various multi-protocol signals together using TDM or packet techniques, and to then communicate the resulting multiplexed signal on a single wavelength over a DWDM optical communication network. Unfortunately, this approach often requires costly demultiplexing equipment at intermediate sites when a single protocol signal must be dropped, or removed, from the multiplexed signal. Another approach to providing such services, and communicating such multi-protocol signals, has been to utilize separate wavelength channels in a DWDM optical communication network for each of the respective protocols. However, the use of separate wavelength channels may be inefficient and wasteful of the finite number of available optical wavelength channels if one or more of the channels operates at a low data rate.

Therefore, there exists in the industry, a need for a system, including apparatuses and methods, which increases optical communication network or system capacity without necessitating the use of very high speed modulation or very dense wavelength spacing, which enables the dropping of signals without costly demultiplexing equipment, and which addresses these and other related, and unrelated, difficulties and shortcomings.

SUMMARY OF THE INVENTION

Briefly described, the present invention comprises an optical communication system, including apparatus and methods, which uses coherence multiplexing to optically multiplex different signals that may have varying protocols or operate at lower speeds, onto a single wavelength channel which is dense wavelength division multiplexed with other channels for optical communication. The use of coherent multiplexing of different signals in combination with DWDM allows increases in network or system capacity without the need for very dense wavelength spacing or very high speed modulation, thereby simplifying optical communication networks and resulting in reduced costs. In addition, the present invention includes apparatuses and methods of dropping and inserting selected single protocol signals at intermediate sites which are less costly and make less wasteful use of optical wavelength channels for the communication of lower data rate information, while maintaining high efficiency in an optical DWDM communication network.

The optical communication system of the present invention has applicability in many different communication environments, including without limitation, point to point links, metropolitan networks, local area networks, and multiple-access environments. Such applicability is due in part because the communication link (i.e., the optical DWDM communication network) of the present invention includes, but is not limited to, optical fiber and/or free space, optical amplifiers, dispersion compensating elements, passive or active optical filters and/or modulators, add-drop multiplexers, optical taps, optical switches and/or routers, and repeaters. The use of dispersion management (i.e., multiple cascaded fibers with differing dispersion properties) and/or dispersion compensation (in which dispersion compensating elements are used), as are common for NRZ and RZ amplitude modulation with direct detection, minimizes the distortion of communicated data for phase, frequency, and/or amplitude modulation.

In accordance with a preferred embodiment, the optical communication system of the present invention comprises an optical DWDM multiplexer, an optical DWDM demultiplexer, an optical DWDM communication network communicatively connected therebetween, a plurality of coherence multiplexer units connected for communication with the optical DWDM multiplexer, and a plurality of coherence demultiplexer units connected for communication with the optical DWDM demultiplexer. In operation, each coherence multiplexer unit: receives light from a light source unit and a plurality of input signals containing data, or information; modulates the incoming light with the received input signals to produce modulated optical signals corresponding to the received input signals; and, combines the modulated optical signals to generate a coherence multiplexed optical signal containing the received input data, or information. The coherence multiplexed optical signal produced by each coherence multiplexer utilizes a different wavelength than the coherence multiplexed optical signals produced by the other coherence multiplexers. The optical DWDM multiplexer receives the coherence multiplexed optical signals, combines them into a single DWDM multiplexed optical signal, and transmits the DWDM multiplexed optical signal to the optical DWDM demultiplexer via the optical DWDM communication network. Upon receiving the DWDM multiplexed optical signal, the optical DWDM demultiplexer separates the signal into coherence multiplexed optical signals corresponding to the coherence multiplexed optical signals which were produced by the coherence multiplexer units. The optical DWDM demultiplexer then communicates the coherence multiplexed optical signals to coherence demultiplexer units which use interference techniques to separate the received coherence multiplexed optical signals and to detect the data, or information, included in the received coherence multiplexed optical signals. The coherence demultiplexer units then produce data, or information, output signals corresponding to the data, or information, input signals received by the coherence multiplexer units.

Accordingly, it is an object of the present invention to simplify optical communication systems.

Another object of the present invention is to reduce costs associated with optical communication systems.

Still another object of the present invention is to enable increases in the capacity of optical communication systems without the need for very high speed modulation.

Still another object of the present invention is to enable increases in the capacity of optical communication systems without the use of very dense wavelength spacing.

Other objects, features, and advantages of the present invention will become apparent upon reading and understanding the present specification when taken in conjunction with the appended drawings.

DETAILED DESCRIPTION OF THE PREFERRED AND ALTERNATE EMBODIMENTS

Figure 1:
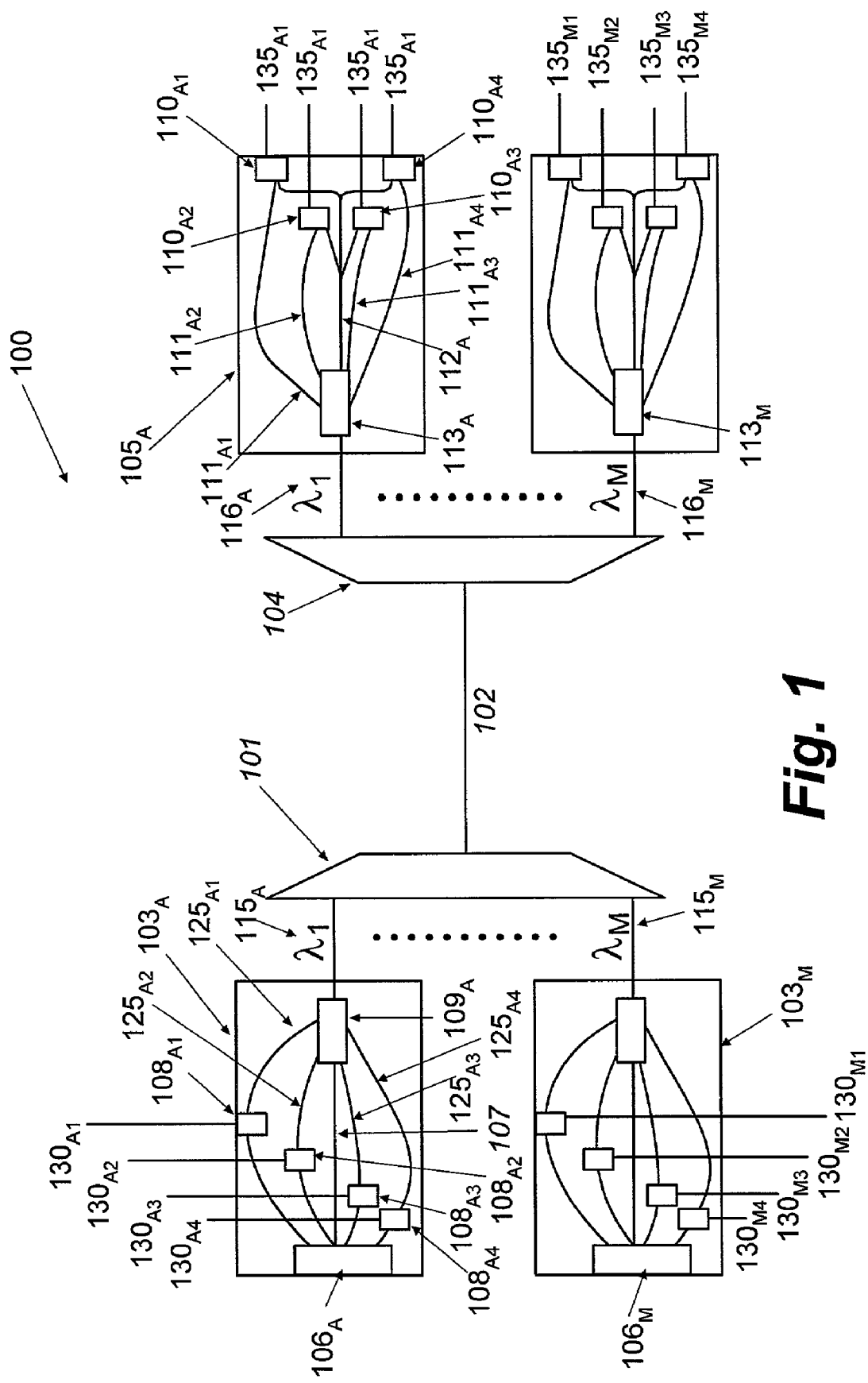
FIG. 1 is a block diagram representation of an optical communication system in accordance with the preferred embodiment of the present invention.

Referring now to the drawings, like numerals represent like components or steps throughout the several views, including pluralities of similar or identical components which are labeled with like numerals, but with differing subscripts (i.e., $115_A, \ldots, 115_M$) to delineate individual components. Often, in the description that follows, a component of a plurality of similar or identical components may be referenced using the numeral (i.e., 115) common to all components of that plurality of components, thereby indicating that the description applies to any of the plurality's components.

FIG. 1 illustrates an optical communication system 100 in accordance with the preferred embodiment of the present invention. The optical communication system 100 comprises an optical DWDM multiplexer 101, an optical DWDM demultiplexer 104, an optical DWDM communication network 102 (also sometimes referred to herein as "DWDM network 102") communicatively connected to and interposed therebetween, a plurality of coherence multiplexer units 103 connected for communication with the optical DWDM multiplexer 101 via respective optical signal paths 115, and a plurality of coherence demultiplexer units 105 connected for communication with the optical DWDM demultiplexer 104 via respective optical signal paths 116.

The coherence multiplexer units 103, located at a first end of the DWDM network 102, each receive light from a respective light source unit 106 and a plurality of input signals containing data, or information, on respective input signal lines 130, modulate the incoming light with the received input signals to produce respective modulated optical signals (i.e., also sometimes referred to herein as "optical data signals") on different optical signal paths 125 corresponding to the received input signals, and combine the modulated optical signals to generate a coherence multiplexed optical signal on an optical signal path 115 containing the received input data, or information, and having a different wavelength of light than the coherence multiplexed optical signals of the other coherence multiplexers 103. Together, the coherence multiplexer units 103 produce "M" respective coherence multiplexed optical signals on optical signal paths 115 having different wavelengths $\lambda_1$ to $\lambda_M$ of light (i.e., defining different wavelength channels corresponding to the different wavelengths) and having different data, or information, input signals modulated thereon as described below.

The optical DWDM multiplexer 101, also located at the first end of the DWDM network 102, receives the "M" coherence multiplexed optical signals from the respective coherence multiplexer units 103 via respective optical signal paths 115. Then, the optical DWDM multiplexer 101 combines the "M" coherence multiplexed optical signals (i.e., by combining the "M" different wavelengths of received light) and, hence, the modulated data, or information, input signals into a single DWDM multiplexed optical signal which the optical DWDM multiplexer 101 transmits to the optical DWDM demultiplexer 104 via the DWDM network 102.

The optical DWDM demultiplexer 104, located at a second end of the DWDM network 102, receives the single DWDM multiplexed optical signal transmitted from the optical DWDM multiplexer 101 and separates the single DWDM multiplexed optical signal into "M" coherence multiplexed optical signals (i.e., and the "M" different wavelengths and corresponding "M" different wavelength channels) corresponding to the "M" coherence multiplexed optical signals which were produced by respective coherence multiplexer units 103. The optical DWDM demultiplexer 104 communicates the "M" coherence multiplexed optical signals to respective coherence demultiplexer units 105, also located at the second end of the DWDM network 102, via respective optical signal paths 116.

The coherence demultiplexer units 105 separate the respectively received coherence multiplexed optical signals into respective demultiplexed optical signals on different wavelength channels using interference techniques known to those of reasonable skill in the art. The demultiplexed optical signals include data, or information, output signals corresponding, respectively, to the above described data, or information, input signals received by the coherence multiplexer units 103. Coherence receivers 110 of the coherence demultiplexer units 105 detect the data, or information, signals included in their respectively received optical signals and produce corresponding respective data, or information, output signals on respective output signal lines 135. It should be understood that the scope of the present invention comprises DWDM network 102 and optical signal paths 111, 115, 116, and 125 which include optical and non-optical fiber structures and facilities, and wireless structures and facilities.

Each coherence multiplexer unit 103 includes a light source unit 106 that provides optical energy, or light, with a coherence length $L_{coh}$ at a given wavelength $\lambda_i$ onto "N+1" optical signal paths 107, 125. The wavelength $\lambda_i$ of the light produced by the light source unit 106 of each coherence multiplexer unit 103 differs from the wavelength of the light produced by the light source units 106 of all other coherence multiplexer units 103 so that none of the wavelengths interferes with the other wavelengths. Light source units 106, acceptable in accordance with the preferred embodiment include, but are not limited to, injection lasers, LEDs, fiber lasers, or fiber amplified spontaneous emission sources.

Each optical signal path 125 forms one of "N" signal arms of "N" interferometers with the other arm being reference optical signal path 107. The optical energy, or light, on each optical signal path 125 passes through a modulator 108, which modulates the incoming light with a respective input signal containing data, or information, received on an input signal line 130 to produce a modulated optical signal. The modulators 108 may modulate the amplitude ("ASK"), phase ("PSK") and/or frequency ("FSK") of the incoming light. Return to zero ("RZ") or non-return to zero ("NRZ") formats may be used in accordance with the preferred embodiment. The optical path length of each arm is described as "$L_i$" (where i=1 to N). Each modulated optical signal of the optical signal paths 125 is then recombined with the reference optical signal on reference optical signal path 107 by a combiner 109 to produce a coherence multiplexed optical signal on optical signal path 115. The difference in the optical path length between the reference optical signal path 107 and an optical signal path 125 is described as "$\Delta L_i$" (where i=1 to N).

Each coherence demultiplexer unit 105 includes a splitter 113 which separates the received coherence multiplexed optical signal into "N" optical paths which are each received by a interferometer 310. Within each interferometer 310, each of the "N" optical paths is split into an optical path pair by a splitter 305, where a single path pair is required to demultiplex the respective coherence multiplexed optical signal. Each optical path pair comprises a first signal arm (i.e., an optical signal path 111) having path length, $L_i'$, and a second signal arm (i.e., reference optical signal path 112) having reference path length, $R_i'$. Each optical path pair is then recombined by a recombiner 306 and communicated to a respective coherence receiver 110. According to the preferred embodiment, coherence receivers 110 comprise light source detectors. Preferably, the light source detectors include photodetectors.

The receiver path length difference between each optical signal path 111 and the reference optical signal path 112 is described as $\Delta L_i' = |L_i' - R_i'|$ (where i=1 to N). The coherence receivers 110 optically detect a data, or information, signal based upon constructive and destructive interference that occurs uniquely for each matched interferometer 310, which implies that the coherence multiplexed signal from the coherence multiplexer unit 103 having path length difference $\Delta L_i$ will be demultiplexed by the coherence receiver 110 associated with the respective interferometer 310 having path length difference $\Delta L_i'$ if the difference between these two path length differences is less than the coherence length of the light source ($|\Delta L_i - \Delta L_i'| < L_{coh}$). Furthermore, each optical signal path 111 is separated in path length from all other signal paths 111, 112 by an amount of about the coherence length of the respective light source unit 106, but may be more or less (i.e., each optical signal path 111 is of a different path length such that the respective optical signals propagating along the respective paths 111 arrive at their destination offset relative to one another by an amount based on, or relative to, the coherence length of the light source 106). If $L_{coh}$ is the coherence length of the light source unit 106, then all optical signals must be separated in path from each other by a distance of at least $nL_{coh}$. The variable "n" is the normalized separation relative to L between the first wavelength channel and the reference, and is a number typically between 1 and 10, but may take on a wide range of values. For example, the path length differences for all signal channels may take on the values $$\Delta L_i = [n + 2n(i-1)]L_{coh}.$$

The optimal value of "n" is determined during detailed system design, but the specified path length differences minimize interference among data signals for a given value of "n". For example, if the light source unit 106 is an injection laser with coherence length of about 1 cm, and n=4, then $\Delta L_1 \sim 4$ cm, $\Delta L_2 \sim 12$ cm, etc. Uniform differences of $nL_{coh}$ may result in significant interchannel crosstalk at or within a coherence demultiplexer unit 105.

Figure 2:
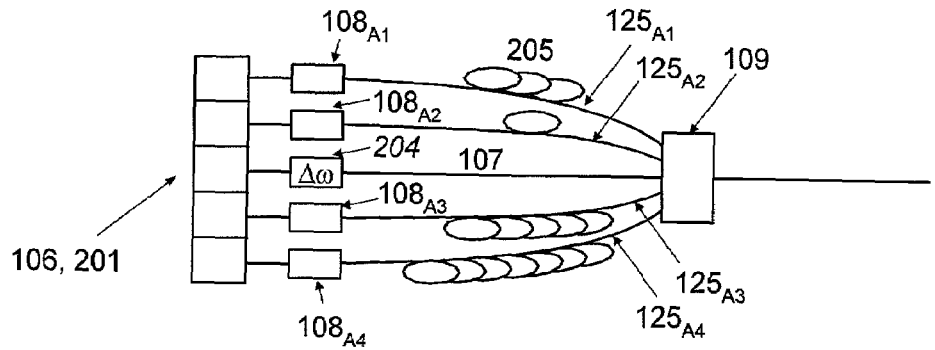
FIG. 2 is a block diagram representation of a coherence multiplexer unit of FIG. 1, displaying the coherence multiplexer unit in more detail.

FIG. 2 provides a more detailed view of a coherence multiplexer unit 103, in accordance with the preferred embodiment, having light source unit 106 which produces "N+1" mutually coherent output optical signals on optical signal paths 107, 125. The light source unit 106 may comprise a light source array 201 including, for example and not limitation, a phase locked diode laser array or phase locked light-emitting diode array, which are of the same coherence length and wavelength, thereby avoiding the costly 1/N splitting losses incurred through use of a single optical source and dramatically increasing the signal to noise ratio at a coherence receiver 110. The array 201 is designed to produce light at the specific wavelength of the DWDM wavelength channel which carries the coherence multiplexed optical signal produced by the coherence multiplexer unit 103.

Each of the mutually coherent output optical signals are coupled, via optical signal paths 125, to a modulator 108 with the exception of a mutually coherent output optical signal on reference optical signal path 107, which may or may not include a modulator 204 such as, for example, a frequency modulator. Each optical signal path 125 has a delay path 205, with the delay path 205 of each optical signal path 125 being different than the delay paths 205 of the other optical signal paths 125 and the reference optical signal path 107. The modulated optical signals on optical signal paths 125 are combined with the mutually coherent output optical signal on reference optical signal path 107 by a combiner 109. The coherence multiplexer unit 103 may include, but not be limited to, optical fibers and fiber modulators, an integrated optic substrate containing lightwave channels and modulators, or a combination thereof.

Figure 3:
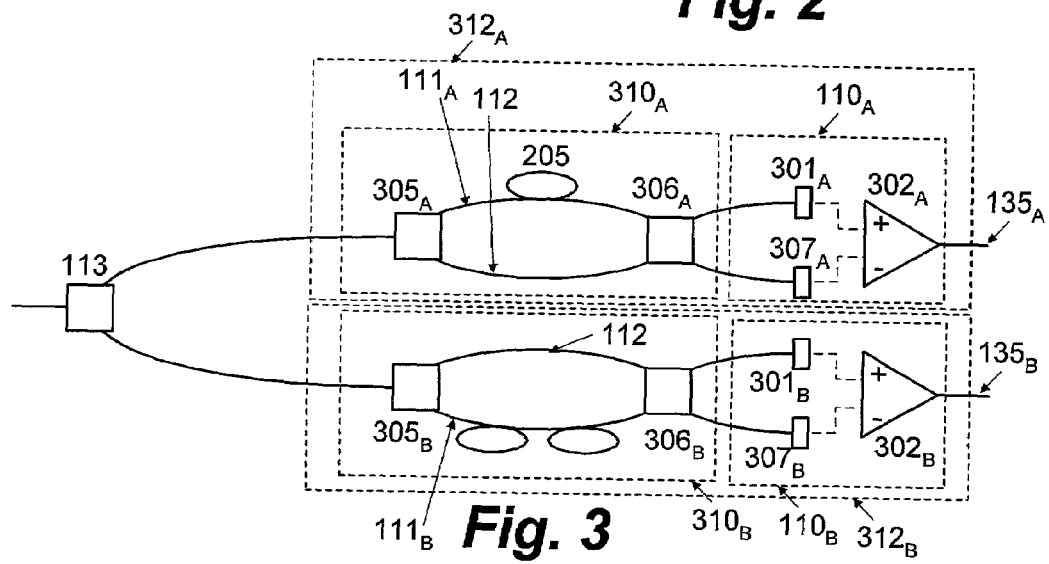
FIG. 3 is a block diagram representation of a portion of a coherence demultiplexer unit of FIG. 1, displaying several demultiplexers in more detail.

FIG. 3 displays a coherence demultiplexer unit 105 according to the preferred embodiment of the present invention, but showing only two demultiplexers 312 instead of the four demultiplexers present in each demultiplexer unit 105 of FIG. 1. Each demultiplexer 312 uses differential detection and may be configured to detect one or more data signals from one or more wavelength channels. The coherence demultiplexer unit 105, as shown, comprises a splitter 113 and a plurality of demultiplexers 312, where each demultiplexer 312 includes an interferometer 310 and a coherence receiver 110. Each interferometer 310 comprises a splitter 305 and a recombiner 306.

Each incoming wavelength channel (i.e., carrying a respective coherence multiplexed optical signal) is split into "N" coherence multiplexed channels using splitter 113. Each data signal is detected by splitting the channel along two paths 111, 112 using splitter 305 and establishing the appropriate path length delay 205 between these paths such that the delay between the data signal path 111 and the reference signal path 112 matches the path delay 205 established at the corresponding coherence multiplexer unit 103 between the desired data and reference signal paths 111, 112. These separate paths 111, 112 are then recombined in recombiner 306, which may result in two output signals that are out of phase from one another.

Each of the output signals of the interferometer 310 are directed to a respective coherence receiver 110, which includes two photodetectors 301, 307 and a differential amplifier 302 configured to differentially detect a modulated optical signal including data or information. This is accomplished by using matched photodetectors 301, 307 and connecting their outputs to the inputs of the differential amplifier 302.

The intensities of the optical signals received by each photodetector 301, 307 may be written approximately as $$I_1 = \frac{1}{2}\left[|s_i(t)|^2 + \sum_{n \neq i}^{N} |s_n(t)|^2 + |s_i(t)||r|\cos(\Delta\omega t + \varphi_m(t) + \Delta\varphi)\right]$$

$$I_2 = \frac{1}{2}\left[|s_i(t)|^2 + \sum_{n \neq i}^{N} |s_n(t)|^2 - |s_i(t)||r|\cos(\Delta\omega t + \varphi_m(t) + \Delta\varphi)\right]$$

where i references the desired data signal, $\Delta\omega$ is the frequency difference between the data and reference signals, $\varphi_m(t)$ represents phase and/or frequency modulation of the data, and $\Delta\varphi$ is the phase error due to error in the path length difference $\delta L_i = |\Delta L_i' - \Delta L_i|$ between the corresponding coherence multiplexer unit 103 and coherence demultiplexer unit 105 for the desired channel.

For differential detection, the resulting electrical signal is proportional to the quantity $|s_i(t)||r|\cos(\Delta\omega t + \varphi(t) + \Delta\varphi)$.

Balanced differential detection provides a number of advantages over using a single detector at a single output, including the cancellation of the background and its associated intensity noise and the increasing of the signal level. These effects improve the signal to noise ratio and make it easier to operate in the shot noise limit of detection, especially if the reference level "r" is chosen to be large. In an alternate embodiment of the present invention, the reference level "r" is made larger by allowing the light source 106 to feed a 1×2 coupler where one output path becomes the reference signal and the other output path feeds a 1×N splitter (where "N" is greater than or equal to 3) providing optical energy to each arm of the interferometer signal paths. In addition, amplitude modulation of the data signals can be used as a result of the elimination of the time-dependent background from the coherently multiplexed signals.

In the preferred embodiment, each demultiplexer 312 is configured for differential detection with homodyne reception, in which the difference between the signal frequency for a given coherence demultiplexer channel and the reference frequency is zero. In another alternate embodiment, the phase difference $\Delta\varphi$ is held to a constant value (preferably, at a value which is a multiple of $\pi$), which maximizes contrast in the detection of the information modulation.

Figure 4:
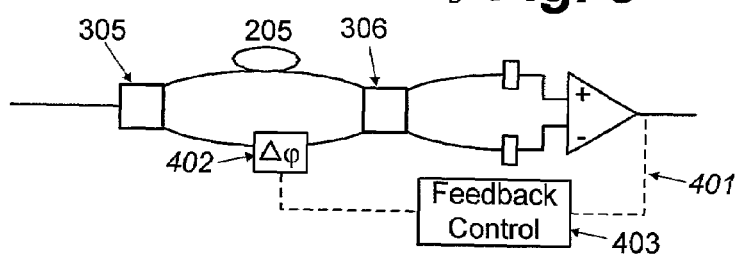
FIG. 4 is a block diagram representation of a demultiplexer of a coherence demultiplexer unit of FIG. 3 having an active feedback stabilization loop.

FIG. 4 depicts a demultiplexer 312 having an active feedback stabilization loop which may be utilized in conjunction with embodiments of the present invention which employ homodyne reception. The stabilization loop 401 may be used to insure, via a phase adjuster 402, that $\Delta\varphi$ is optimized and held at that value. A feedback control 403 may be included in the stabilization loop 401 to adjust the feedback in the loop 401. A low pass filter may be inserted after the amplifier 302 to improve the signal to noise ratio.

Since the data and reference signals traverse the same path through the communications link at nearly the same time, any changes in the state of polarization between a coherence multiplexer unit 103 and the corresponding coherence demultiplexer unit 105 will be the same for all signals. Therefore, in the optical communication system 100 of the preferred embodiment, signal fading due to polarization mismatch can only occur due to (1) polarization dependent elements in the coherence demultiplexer unit 105 (i.e., including, but not limited to, waveguides, splitters, modulators, combiners), and/or (2) relative changes in the state of polarization between the different paths in the coherence multiplexer unit 103 or coherence demultiplexer unit 105. Note that, at each coherence multiplexer unit 103, the state of polarization can be well-defined by the light source unit 106 such that polarization mismatch may only occur at the corresponding coherence demultiplexer unit 105, where the state of polarization is not well defined.

Figure 5:
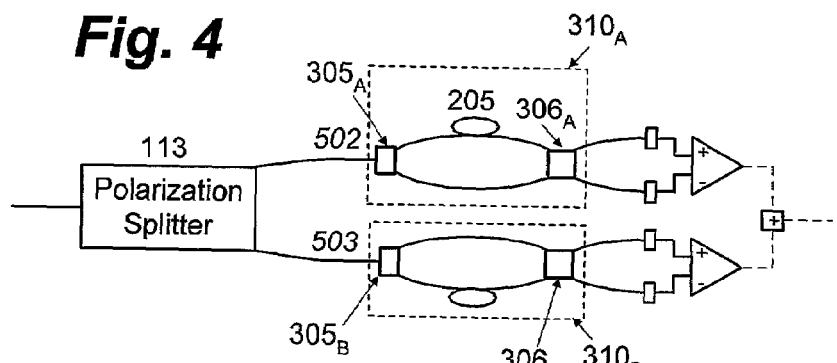
FIG. 5 is a block diagram representation of the coherence demultiplexer unit of FIG. 3 having polarization control using separate polarization paths.

According to an alternate embodiment, a coherence demultiplexer unit 105 having polarization diversity is implemented to accommodate polarization-dependent elements in a demultiplexer 312. In this alternate embodiment and as illustrated in FIG. 5, the incoming coherence multiplexed optical signal is split by polarization splitter 113 into two respective polarization components on optical signal paths 502 and 503 which are directed to two separate demultiplexers 312.

Figure 6:
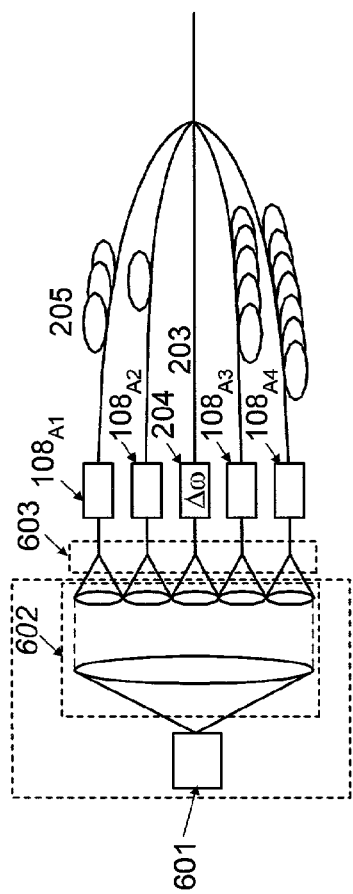
FIG. 6 is a block diagram representation of a coherence multiplexer unit, according to an alternate embodiment of the present invention, having a single light source and a microlens array.

In an alternate embodiment of a coherence multiplexer unit 103 substantially similar to that of the preferred embodiment and as seen in FIG. 6, the coherence multiplexer unit 103 comprises a light source unit 106 having a single light source 601 and an imaging system 602. The single light source 601 may include, for example and not limitation, a single standard telecom laser, a broad-area laser, an LED, a super-luminescent LED, a broad area LED, or an erbium-doped fiber light source). The imaging system 602 may include a microlens array (i.e., as seen in FIG. 6), a cylindrical lens, or any other device which directs light from a light source 601 into array of fibers 603. Advantageously, the imaging system of FIG. 6 does not require complex anamorphic imaging as required for highly efficient coupling into a single fiber.

The coherence properties of the light source unit(s) 106 herein may be adjusted, as appropriate, through control of temperature and/or injection current, or the use of optical feedback and/or optical spectral filters. Filtering may be used to optimize the bandwidth of broadband or incoherent sources in accordance with a given DWDM channel width. Fabry-Perot lasers can have periodic coherence properties, and therefore may place a limit on the number and/or placement of path length differences between the signal and reference paths in the coherence multiplexer units 103. Alternatively, for the light source unit 106 of FIGS. 1 and 2, a phase modulator can be placed between the light source 106 and modulators 108 to broaden the optical spectrum, as may also be used for a single-mode DFB lasers.

Figure 7:
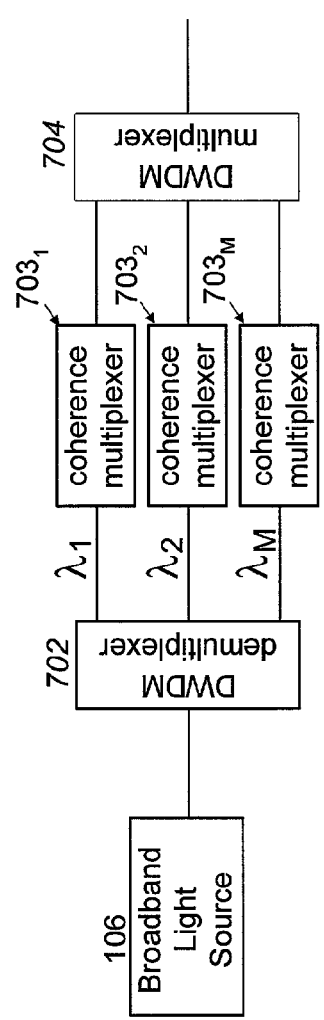
FIG. 7 is a block diagram representation of an optical communication system, in accordance with an alternate embodiment of the present invention, which utilizes spectral slicing to drive a plurality of coherence multiplexer units.

In an alternate embodiment substantially similar to the preferred embodiment and illustrated in FIG. 7, a light source unit 106 comprising a single broadband light source (including, for example and not limitation, an LED, fiber amplifier based source, or mode-locked laser source) is used to simultaneously drive all "M" coherence multiplexer units 103 by the method of spectral slicing. In this alternate embodiment, the output of the light source unit 106 is split into "M" spectral bands of width $\Delta\nu_{band} \leq \Delta\nu_{ch}$, where $\Delta\nu_{ch}$ is the DWDM channel spacing, through the use of a DWDM demultiplexer 702 that may, for example, consist of fiber gratings or diffraction gratings. Each spectral band is then communicated to a coherence multiplexer unit 703. The coherence length for each coherence multiplexer unit 703 is then $L_{coh}=c/\Delta\nu_{band}$, which is chosen appropriately. The outputs of the coherence multiplexer units 703 are multiplexed together using a DWDM multiplexer 704.

In another alternate embodiment of the present invention substantially similar to the preferred embodiment, the demultiplexers 312 of the coherence demultiplexer units 105 utilize heterodyne reception. According to this alternate embodiment, a frequency modulator 204 is positioned in the reference optical signal path 107 of the coherence multiplexer units 103, as shown in FIG. 2, such that the reference frequency is shifted relative to the data signals. An advantage to this alternate embodiment is that active path length stabilization may not be needed, provided that the intermediate frequency $\Delta\omega$ from the frequency modulator 204 is chosen appropriately.

Figure 8:
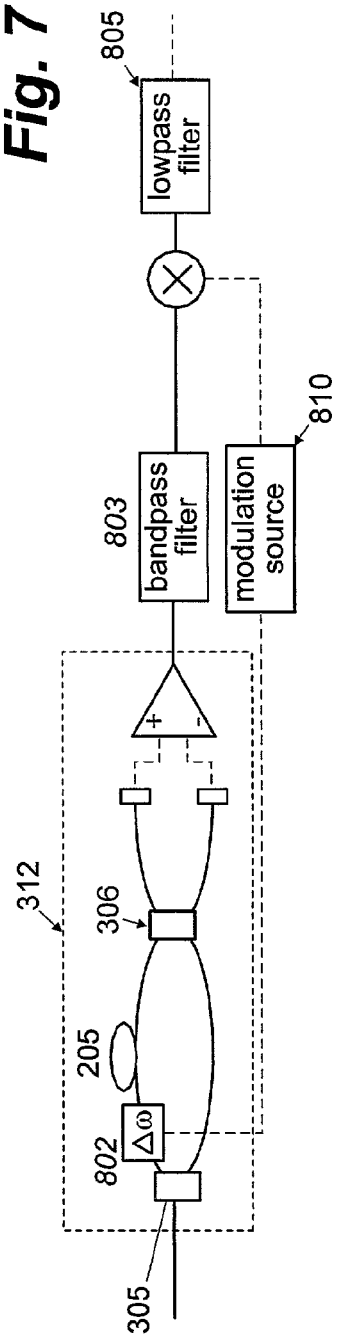
FIG. 8 is a block diagram representation of a demultiplexer of a coherence demultiplexer unit, according to an alternate embodiment of the present invention, having a frequency modulator and a modulation source for heterodyne reception.

FIG. 8 displays another alternate embodiment of the present invention which is substantially similar to the preferred embodiment. In the alternate embodiment of FIG. 8, a frequency modulator 802, having a modulation source 810, is placed in the data or reference signal paths of each demultiplexer 312 of each coherence demultiplexer unit 105. Alternatively, frequency modulation of the data signals in a coherence multiplexer unit 103 can also be used with no frequency shift of the reference signal, as in the case of frequency modulation homodyne reception. In all cases in which $\Delta\omega \neq 0$, an electrical bandpass filter 803 can be used to reduce noise, as shown.

Heterodyne reception can either be synchronous or asynchronous. In synchronous reception, the electrical signal is demodulated to baseband and passed through a low pass filter 805. Synchronous reception requires recovery of the intermediate frequency $\Delta\omega$ by each coherence receiver 110 if frequency shifting was produced at the coherence multiplexer unit 103, but does not require recovery if the frequency shift is produced at the coherence demultiplexer unit 105, as shown in FIG. 8.

Asynchronous reception uses an envelope detector to convert to baseband, which does not require recovery of the intermediate frequency, but allows both in-phase and quadrature components of the noise to pass. In situations in which frequency modulation is used and the bandwidth of the source is less than the modulation bandwidth, then it may be desirable to use two parallel channels each consisting of bandpass filters, envelope detectors, and low pass filters. These outputs are then subtracted. Alternatively, each parallel channel could be directly connected to one optical detector (e.g., photodetector), with the outputs of the channels connected to a differential amplifier. For asynchronous demodulation with phase modulation, it may be desirable to use differential phase modulation, such that delay demodulation is used at the coherence receiver 110.

Figure 9:
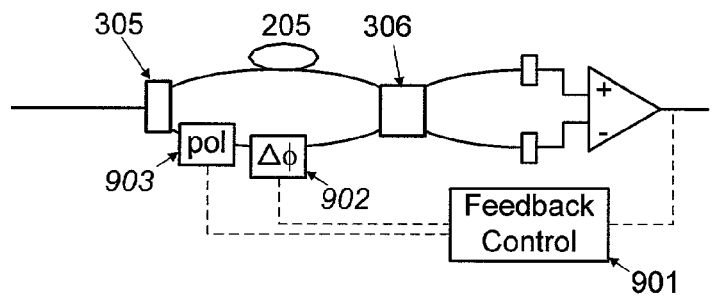
FIG. 9 is a block diagram representation of a demultiplexer of a coherence demultiplexer unit, according to an alternate embodiment of the present invention, having polarization and phase feedback control.

According to another alternate embodiment substantially similar to the preferred embodiment and illustrated in FIG. 9, a polarization adjuster 903 is placed in all optical signal paths of the coherence multiplexer units 103 or in one arm of every path pair of the coherence demultiplexer units 105 to adjust for changes in the relative state of polarization between the signal and reference paths of the coherence multiplexer units 103 or coherence demultiplexer units 105. In the simplest form, a feedback optimization loop 901 is derived from the output of each coherence receiver 110 and directed back to the path with the polarization adjuster 903. In this embodiment, a dual feedback stabilization technique may be used to optimize the settings of the phase adjuster 902 and polarization adjuster 903.

Figure 10:
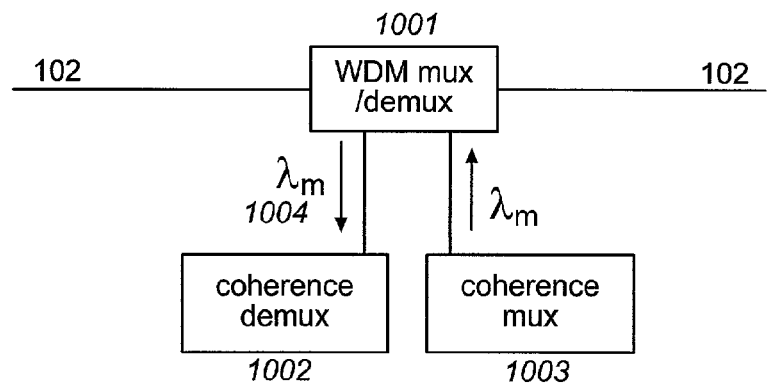
FIG. 10 is a block diagram representation of an optical communication system, in accordance with an alternate embodiment of the present invention, which is arranged to provide the drop and add of data, or information, from a single channel of a DWDM network.

In accordance with another alternate embodiment substantially similar to the preferred embodiment, the optical communication system 100 is arranged to provide the drop and add of data, or information, along a communication path of the DWDM network 102 as displayed in FIG. 10. In this embodiment, an optical DWDM channel 1004 is dropped at an intermediate location through a DWDM mux/demux 1001. The channel includes "N" coherence multiplexed information signals that are delivered optically to the coherence demux 1002. New information channels are coherence multiplexed together in the coherence multiplexer 1003 at the intermediate site and delivered to the optical DWDM mux/demux 1001 for insertion into the DWDM network 102.

Figure 11:
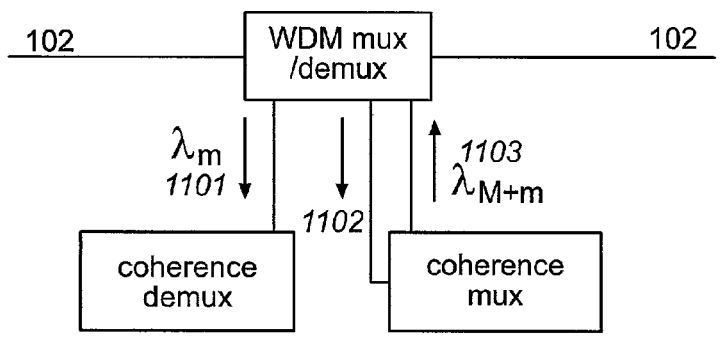
FIG. 11 is a block diagram representation of an optical communication system, in accordance with an alternate embodiment of the present invention, which is arranged to provide the drop and add of data, or information, from multiple channels of a DWDM network.

In another alternate embodiment substantially similar to the preferred embodiment and shown in FIG. 11, two wavelength channels may be dropped at each intermediate location. The first channel 1101 contains coherence multiplexed signals, while the second channel 1102 contains no data or information. The wavelength of the second channel is then coherence multiplexed with one or more data signals, and the resultant signal 1103 is added back onto the DWDM network 102. This method alleviates the need for a wavelength source at each intermediate location, but a separate, local source may be used instead.

According to another alternate embodiment substantially similar to the preferred embodiment, a desired wavelength channel is dropped at the intermediate add/drop node and communicated to a coherence demultiplexer which is optimized to extract one or more of the coherence multiplexed channels from the dropped DWDM wavelength channel.

Figure 12:
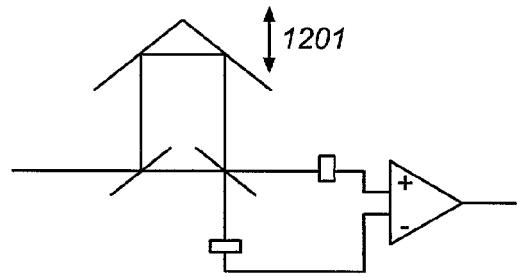
FIG. 12 is a block diagram representation of a coherence receiver, according to an alternate embodiment of the present invention, having a variable path delay.

An intermediate add/drop node may have multiple intermediate sites with coherence demultiplexers including a splitter, delay path, combiner, and detector components for the detection of multiple data signals of fixed path length difference. The node may have one or more wavelength drop filters or taps with which to extract one or more wavelength channels. The coherence receiver may also have one or more optical detectors in which a variable delay 1201 is introduced into one of the paths which allows a single optical detector to detect any data signals within a DWDM channel by appropriately adjusting the delay (see FIG. 12). The variable path delay is established by placing a reflective element on a translation stage, for example and not limitation, using a bulk device or a MEMs device. The reflecting element, for example, is mounted to a piezoelectric crystal or a phase adjuster inserted into the optical path in order to actively stabilize the path length difference, as may be necessary for homodyne reception.

In DWDM networks, the channel frequency (or wavelength) spacing is taken as a uniform value, such as 50 GHz or 100 GHz. This channel spacing $\Delta v_{ch}$ then determines the properties of the optical source of each of the "M" coherence multiplexers. The spectral width of the source $\Delta v_{source} \leq \Delta v_{ch}$, which means the coherence length of the source $L_{coh} \approx c/\Delta v_{source} > c/\Delta v_{ch}$. For example, a 100 GHz DWDM channel spacing requires an optical source with free-space coherence length $L_{coh} > 3$ mm.

Whereas this invention has been described in detail with particular reference to its preferred and alternate embodiments, it is understood that variations and modifications can be effected within the spirit and scope of the invention, as described herein before and as defined in the appended claims. The corresponding structures, materials, acts, and equivalents of all means plus function elements, if any, in the claims below are intended to include any structure, material, or acts for performing the functions in combination with other claimed elements as specifically claimed.

What is claimed is:

1. A method of receiving a plurality of optical signals that have been coherently multiplexed together and transmitted over an optical link from a first site to a second site, the method comprising the steps of:

receiving an optical signal including a first coherently multiplexed optical signal and a second coherently multiplexed optical signal, wherein the first coherently multiplexed optical signal includes a first optical signal offset in time relative to a second optical signal and having the same phase as the second optical signal, and wherein the second coherently multiplexed optical signal includes a third optical signal offset in time relative to a fourth optical signal and having the same phase as the fourth optical signal;

wavelength division demultiplexing the received optical signal into the first coherently multiplexed optical signal and the second coherently multiplexed optical signal;

optically splitting the first coherently multiplexed optical signal into optical signals on first and second path pairs, wherein a single path pair forms an interferometer comprising an optical signal path and a reference path having different path lengths ($\Delta L_i'$); and coherently demultiplexing the first coherently multiplexed optical signal into the first and second optical signals;

wherein the step of coherently demultiplexing includes polarization splitting of the first coherently multiplexed optical signal allowing the polarized signals to be directed to two separate demultiplexing interferometers.

2. A method of communicating a plurality of optical signals over an optical link from a first site to a second site, the method comprising the steps of:

optically multiplexing a plurality of output optical signals to form a multiplexed optical signal at a first site, wherein each output optical signal of the plurality of output optical signals includes a coherently multiplexed plurality of modulated optical signals that are offset in time relative to one another, and wherein each of the modulated optical signals has the same wavelength and the same phase:

communicating the multiplexed signal;

optically demultiplexing the multiplexed signal at a second site into a plurality of optically demultiplexed signals;

delivering the plurality of optically demultiplexed signals to at least one coherence demultiplexer;

optically splitting the plurality of optically demultiplexed signals into a plurality of optical signals on a plurality of path pairs wherein a single path pair forms an interferometer including two arms having different path lengths ($\Delta L_i'$), and wherein the two arms include a signal path carrying a data signal and a reference path carrying a reference signal;

recombining the data signal and the reference signal to produce a recombined signal; and communicating the recombined signal to a coherence receiver having two light source detectors connected to a differential amplifier;

wherein the step of optically splitting includes polarization splitting of each of the optically demultiplexed signals of the plurality of optically demultiplexed signals.

* * * * *